(12) United States Patent
Milbeck et al.

(10) Patent No.: US 8,074,960 B2
(45) Date of Patent: Dec. 13, 2011

(54) SYSTEM AND METHOD FOR RESTRICTING ACCESS TO A VALVE

(75) Inventors: Katherine T. Milbeck, Wauwatosa, WI (US); Thomas J. Edwards, Colgate, WI (US); Christopher J. Rohde, West Allis, WI (US); Kenneth W. Phillips, Mukwonago, WI (US); Steven J. Lockwood, Cudahy, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 515 days.

(21) Appl. No.: 12/264,603

(22) Filed: Nov. 4, 2008

(65) Prior Publication Data

US 2010/0108921 A1   May 6, 2010

(51) Int. Cl.
   *F16K 35/00*   (2006.01)
(52) U.S. Cl. ............... 251/93; 251/90; 70/178
(58) Field of Classification Search .......... 251/90, 251/92, 93; 70/175, 178; 137/385
   See application file for complete search history.

(56) References Cited

U.S. PATENT DOCUMENTS

| | | | |
|---|---|---|---|
| 1,947,081 A * | 2/1934 | Grady et al. ............... 70/178 |
| 3,391,554 A * | 7/1968 | Wrenshall .................. 70/178 |
| 5,115,834 A * | 5/1992 | Champagne ................ 137/385 |
| 5,238,141 A * | 8/1993 | Callegari et al. ........... 220/725 |
| 5,244,008 A | 9/1993 | Bauer | |
| 5,638,858 A | 6/1997 | Gettinger et al. | |
| 5,806,555 A * | 9/1998 | Magno, Jr. ................ 137/385 |
| 5,927,313 A | 7/1999 | Hart | |
| 6,170,306 B1 * | 1/2001 | Kitley et al. ............... 70/178 |
| 6,453,707 B2 * | 9/2002 | Nishimura et al. .......... 70/180 |
| 6,994,106 B1 * | 2/2006 | Hackley et al. ............ 137/385 |

FOREIGN PATENT DOCUMENTS

| EP | 1848259 A2 | 10/2007 |
| GB | 2281372 | 3/1995 |

OTHER PUBLICATIONS

Hose Clamp—Wikipedia, the free encyclopedia; http://en.wikipedia.org/wiki/Hose_clamp; accessed Sep. 25, 2008; 4 pages.
Plug Valve—Wikipedia, the free encyclopedia; http://en.wikipedia.org/wiki/Plug_valve; accessed Sep. 25, 2008; 2 pages.

(Continued)

*Primary Examiner* — John Fristoe, Jr.
(74) *Attorney, Agent, or Firm* — Whyte Hirschboeck Dudek S.C.

(57) ABSTRACT

A method and system for restricting access to a valve stem of a valve by employing a valve locking assembly is disclosed. The locking assembly comprises a first means for receiving a valve stem of a valve and an engaging member. The locking assembly additionally comprises a second means for receiving the valve stem of the valve and comprising a slide for engaging the engaging member of the first means, the slide having a first length along an outer periphery of the second means and a second length intersecting the first length such that the second length is shorter than the first length. The locking assembly additionally comprises a third means for releasably securing the second means in position about the valve stem of the valve, wherein the first means is capable of being positioned over the second and the third means about the valve stem.

33 Claims, 5 Drawing Sheets

OTHER PUBLICATIONS

Valve—Wikipedia, the free encyclopedia; http://en.wikipedia.org/wiki/Valve; accessed Sep. 25, 2008; 9 pages.

PCT/US2009/063110; Notification of Transmittal of International Preliminary Report on Patentability and Written Opinion of the International Searching Authority; May 19, 2011; 7 pages.

PCT/US2009/063110; Notification of Transmittal of the International Search Report and the Written Opinion of the International Searching Authority; Apr. 27, 2010; 13 pages.

\* cited by examiner

SYSTEM AND METHOD FOR RESTRICTING ACCESS TO A VALVE

FIELD OF THE INVENTION

The present invention relates to valves and, more particularly, to valves having valve stems. In one aspect, the present invention relates to a locking assembly for valves. In another aspect, the present invention relates to a locking assembly capable of restricting access to the valve stem of a plug valve.

BACKGROUND OF THE INVENTION

Valves and, particularly, plug valves are employed in a wide variety of applications, such as, industrial, residential, commercial, petrochemical, automotive and the like for regulating the flow of fluids. Often, it is critical that accidental or malicious tampering of the valves be prevented. Controlling and/or preventing inadvertent accidents or mistakes can particularly be of significant importance in areas utilizing a large number of valves or when the fluids controlled by such valves are hazardous. Since the inadvertent or mistaken opening or closing of the valves may result in economic or possibly even personal injury, it is often desirable to restrict access to the valves and particularly, restrict access to the valve stem(s) by way of which those valves can be regulated in open and closed positions. Frequently, access to the valve stem can be prevented by utilizing a locking mechanism, which locks the valve in a predetermined position and additionally prevents undesirable tampering of the valve.

A variety of such locking mechanisms have been proposed in the past. Although adequate in most regards, such valves are nevertheless lacking in at least some aspects. For example, in at least some conventional locking mechanisms, the handle or lever utilized for operating the valve is removed and placed into a pocket, which is locked. Such locking mechanisms do not necessarily lock the valve itself, which is still subject to tampering or accidental operation by utilizing other handles or handle-like mechanisms. Some other conventional locking mechanisms are equipped with structures that are capable of being secured to the handle while being connected to the valve. Such mechanisms although effective in preventing accidental (or malicious) operation of valves having handles, these mechanisms are generally not effective in valves that do not have handles or otherwise valves in which such handles are removed after operation. Some further conventional locking mechanisms require complex tools and/or specialized skills to operate. Some additional locking mechanisms are described in U.S. Pat. Nos. 5,238,141, 5,244,008, 5,638,858 and 5,927,313.

In view of foregoing, it would be advantageous if an improved locking mechanism for restricting accidental or malicious tampering of the valve is provided. It would additionally be advantageous if such a locking mechanism is capable of operating in valves with removed handles. It would further be advantageous if the locking mechanism were easy to handle and operate without requiring any unnecessary tools or specialized skills.

SUMMARY OF THE INVENTION

In one aspect, the present invention relates to a locking assembly for restricting access to a valve stem of a valve. The locking assembly comprises a first means for receiving a valve stem of a valve and comprising an engaging member, and a second means for receiving the valve stem of the valve and comprising a slide for engaging the engaging member of the first means, the slide having a first length along an outer periphery of the second means and a second length intersecting the first length such that the second length is shorter than the first length. The locking assembly additionally comprises a third means for releasably securing the second means in position about the valve stem of the valve, wherein the first means is capable of being positioned over the second and the third means about the valve stem.

In another aspect, the present invention relates to a method for restricting access to a valve stem of a valve. The method comprises providing (a) a base having a slide, the slide comprising a first length along an outer periphery of the base and a second length intersecting the first length such that the second length is shorter than the first length; (b) a clamping mechanism for releasably securing the base in position about a valve stem of a valve; and (c) a cover defining a cavity for receiving the valve stem and further having an engaging member for engagement with the slide of the base. The method additionally comprises positioning the base around the valve stem of the valve, securing the base in position about the valve stem by utilizing the clamping mechanism and engaging the cover with the base for restricting access to the valve stem.

In yet another aspect, the present invention relates to a locking assembly for restricting access to a valve stem of a valve comprising a cover defining a cavity for receiving a valve stem of a valve and an engaging member for restricting access to the valve stem, and a strap capable of being wrapped around a body of the valve and having a first, end and a second end, wherein the first end is attached to a first side of the cover and the second end is capable of releasably engaging with the engaging member.

In a further aspect, the present invention relates to a locking assembly for restricting access to a valve stem of a valve comprising a base defining an opening for receiving a valve stem of a valve and having a base flange extending outwardly from a periphery thereof, the base flange having at least one base locking aperture and a hose clamp positioned above the base about the valve stem for releasably securing the base in position about the valve stem. The locking assembly additionally comprises a cover defining a cavity for receiving the valve stem, and a cover clamp extending outwardly from a bottom portion of the cover corresponding to the base flange, the cover flange having at least one cover locking aperture formed therein, such that the cover is hingedly connected to the base such that in a closed position, at least one of the at least one base locking aperture and at least one of the at least one cover locking aperture are aligned together for installing a lock.

Other aspects and embodiments are contemplated and considered within the scope of the invention.

DETAILED DESCRIPTION OF THE PREFERRED EMBODIMENT

"Valve" as used herein is intended to imply any device (including disposable devices) capable of regulating flow of fluids including, gases, gels, liquids, fluidized solids (or semi-solids) and/or slurries for use in a wide variety of applications including, residential, commercial, industrial, military, automobile and transportation and the like. Further, the "valve" can be one-way, two-way or potentially a multi-way or multi-port device for regulation.

"Plug Valve" as used herein is a type of "valve", specifically having a valve stem for regulating the flow of fluids through the valve, wherein the valve stem is a rod or cylindrical (or other shaped) shaft spanning the inside and the outside of the valve employed for transmitting motion to an additional structure for operating the valve.

"Clamp" as used herein is intended to include a variety of fastening devices employed for preventing removal of one or more objects relative to an additional structure.

Relatedly, various components associated with a valve and a locking assembly, such as, gaskets, seals, handles, hoses and other related structures, are not shown in the figures. Such conventional components are contemplated and considered within the scope of the present invention. Additionally, although the embodiments described below have been described in relation to a plug valve, it will be understood that the locking assembly can be utilized in a variety of other types of valves having valve stems or potentially even in devices other than valves but those that have shafts or stems to which access is to be restricted.

Furthermore, embodiments of the invention are disclosed with reference to the accompanying drawings and these embodiments are provided for illustrative purposes only. The invention is not limited in its application to the details illustrated in the drawings. Also, like reference numerals are used to indicate like components in the drawings.

Figure 1:
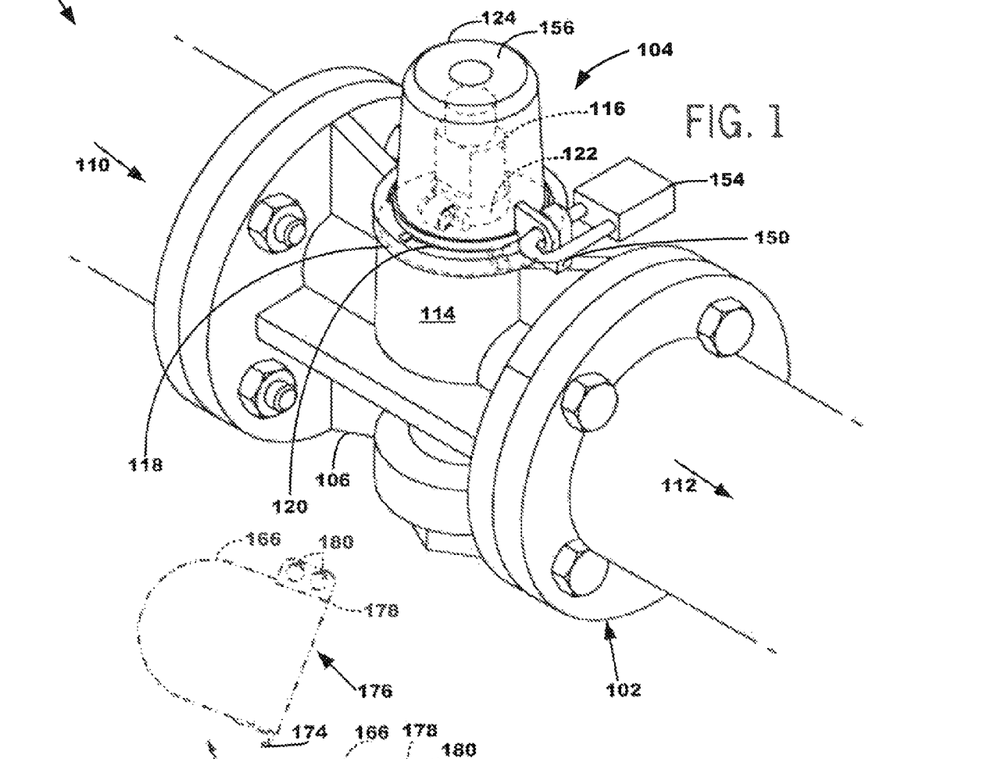
FIG. 1 is a front perspective view of a plug valve showing a first embodiment of a valve locking assembly assembled over the plug valve, in accordance with at least some embodiments of the present invention.
Figure 2:
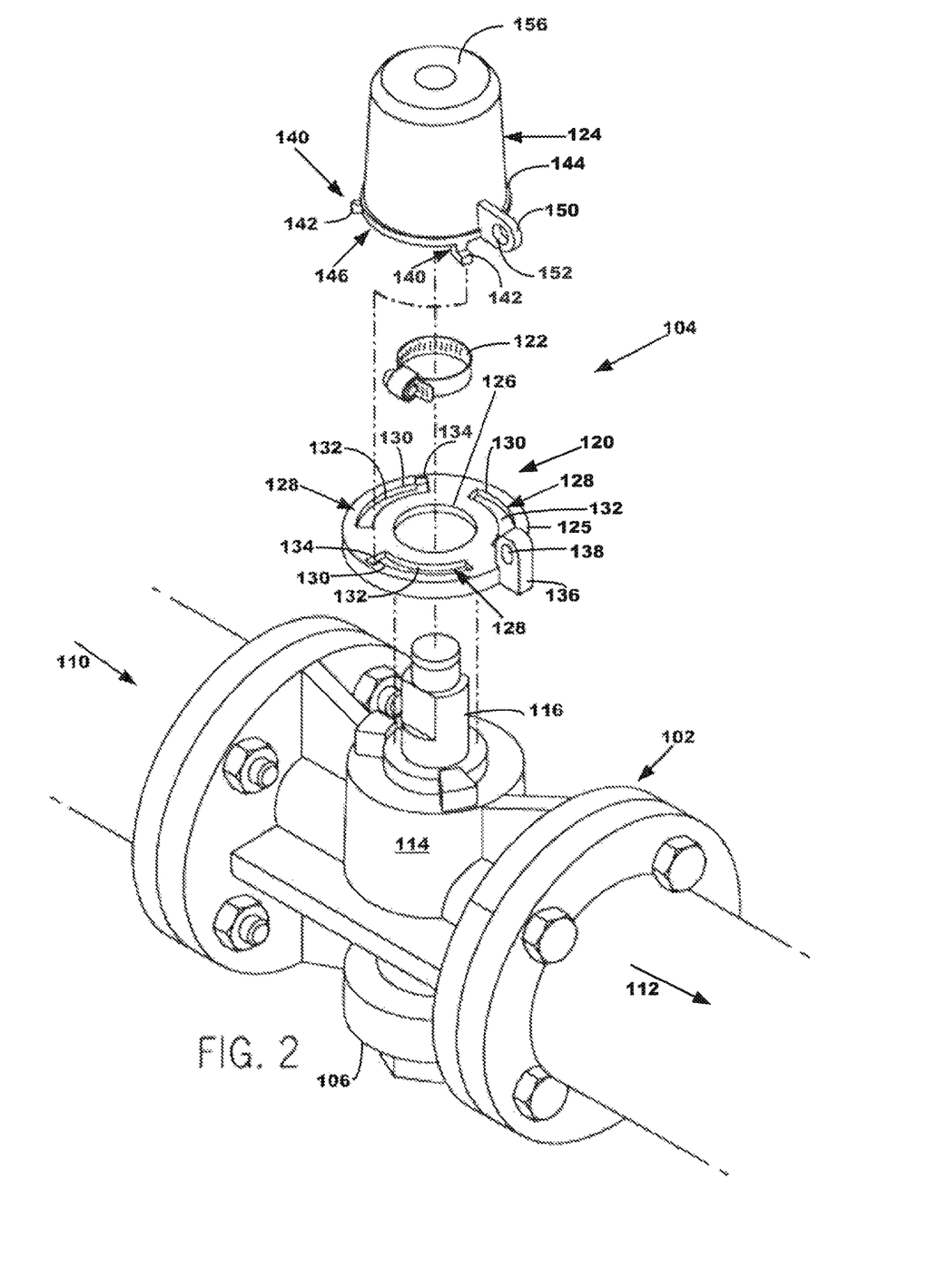
FIG. 2 shows an exploded view of the valve locking assembly in relation to the plug valve of FIG. 1.

Referring now to FIGS. 1 and 2, assembled and exploded front perspective views, respectively, of a first embodiment of an exemplary valve assembly 100 are shown, in accordance with at least some embodiments of the present invention. As shown, the valve assembly 100 includes a valve 102 connected in operational association with a valve locking assembly 104 for restricting access to the valve stem. In at least some embodiments and, as shown, the valve 102 is a conventional plug valve (or plug-type valve) having a body 106. The body 106 defines a flow passageway (not visible) extending internally from an inlet opening, referenced by arrow 110, to an outlet opening, referenced by arrow 112, for facilitating passage of fluids through the valve 102.

Further, the flow of fluids through the flow passageway can be controlled by way of a valve member 114 (only the outer body of the valve member is visible), which in at least some embodiments can be a rotatable valve member extending vertically within the body 106 and across the flow passageway. The valve member 114 in particular has defined on a bottom portion adjacent to the flow passageway an opening (not visible), which can be manipulated into or out of registry with the flow passageway to selectively control the flow of fluids through the valve 102. For example, the valve member 114 can be rotated in a closed position, which moves the opening in the valve member out of registry with the flow passage, thereby blocking the flow passageway and restricting the flow of fluids from the inlet opening (as represented by the arrow 110) to the outlet opening (as represented by the arrow 112). Relatedly, the valve member 114 can be rotated into an open position, which moves the opening of the valve member in registry with the flow passageway to permit the flow the flow of fluids from the inlet to the outlet openings. Thus, by virtue of controlling the valve member 114, the flow of fluids through the valve 102 can be selectively controlled.

Furthermore, the rotation of the valve member 114 to facilitate the opening and closing of the valve 102 can be effectuated by utilizing a valve stem 116 (also referred herein as valve shaft) connected to the valve member and extending out of the body 106 through a top surface 118 of the valve. In at least some embodiments, the valve stem 116 can be equipped with a removable (or alternatively integral) handle and/or wrench/lever (not shown) for conveniently rotating the valve stem. By virtue of rotating the valve stem 116, the rotational force of the valve stem can be transmitted to the valve member 114 for opening and closing the flow passageway. Notwithstanding the fact that in the present embodiment, the valve member 114 is a rotatable structure, this need not always be the case in other embodiments. Rather, the valve member 114 can be actuatable in a variety of manners including, for example, pulling and pushing, left and right movement, and the like.

Furthermore, to prevent accidental actuation or malicious tampering of the valve 102, in at least some embodiments, the valve assembly 100 can be equipped with the valve-locking assembly 104. The valve locking assembly 104 in particular restricts access to the valve stem 116, thereby preventing accidental (or malicious) rotation of the valve stem, which in turn prevents accidental (or malicious) operation of the valve 102. As seen specifically in the exploded view of FIG. 2, the valve locking assembly 104, in at least embodiments, includes a base member 120, a clamp member 122 and a cover member 124, assembled in operational association, as described in greater detail below.

With respect to the base member 120 in particular, in at least some embodiments, it can be a circular or substantially circular plate or plate-like structure defining an outer rim 125 and a valve stem opening 126. The valve stem opening 126 is defined in a generally central portion of the base member 120 for receiving the valve stem 116. Furthermore, it should be understood that although in the present embodiment the valve stem opening 126 is circular in shape and sized to accommodate a cylindrical valve stem (e.g., the valve stem 116), this need not always be the case. Rather, in other embodiments (not shown), the valve stem opening 126 can assume a variety of shapes and sizes depending upon the shape and size, respectively, of the valve stem 116. Relatedly, the base member 120 need not be circular (or substantially circular) in shape, but can rather assume a variety of shapes and sizes depending upon the shape and size of the top surface 118 of the valve 102.

In addition to the valve stem opening 126, the base member 120 defines a slide 128 for releasably engaging the cover member 124 to restrict access to the valve stem 116, in a manner described below. The slide 128 in particular comprises a plurality of slots (or notches) 130, each of which is a composite slot having an elongated first length 132 and a truncated second length 134 (only two of which are visible in FIG. 2) intersecting the first length. In at least some embodiments, each of the plurality of slots 130 is an L-shaped slot such that the second length 134 extends transversely from an end portion, of the first length. In at least some other embodiments (not shown), each of the plurality of slots 130 can be a T-shaped slot in which the second length 134 bisects the first length 132. In alternate embodiments, also not shown, each of the plurality of slots 130 can assume various other configurations and/or a combination of the above described configurations for facilitating engagement with the cover member 124.

Further, in addition to the lengths and configurations of each of the plurality of slots 130, the width of each of those slots can vary as well. As will be described in greater detail below, the width of the first and/or the second lengths 132 and 134, respectively, of each of the plurality of slots 130 can vary depending upon the width of corresponding engaging members (described below) on the cover member 124. Furthermore, although in the present embodiment, the plurality of slots 130 are shown to be three in number, in other embodiments (again, not shown), more than three or potentially fewer than three slots can be present.

In addition to the slide 128 for engaging the cover member 124, the base member 120 is equipped with a flange member 136. The flange member 136 extends outwardly and upwardly from the outer rim 125 of the base member 120 and defines a base locking aperture (or shackle hole) 138 for facilitating interlocking of the base member 120 and the cover member 124. By virtue of interlocking the base member 120 and the cover member 124 together in a manner that the cover member cannot be removed without the use of unnecessary force and/or tools, access to the valve stem 116 to prevent accidental or malicious operation of the valve 102 is further restricted.

The base member 120 can additionally be secured in position about the valve stem 116 by way of affixing the clamp member 122 to the valve stem. In at least some embodiments, and as shown, the clamp member 122 can be a hose clamp that is capable of being fitted about (and to) the valve stem 116 and above the base member 120. Typically, in embodiments employing the hose clamp as the clamp member 122, the hose clamp can be connected to the valve stem 116 such that the circumference of the hose clamp upon installation is larger than the circumference of the valve stem opening 126 of the base member 120. By way of connecting the hose clamp to the valve stem 116 in such a manner, the longitudinal (up and down) as well as lateral (right and left) motion of the base member 120 about the valve stem is restricted. Typically, the hose clamp can be fastened and/or secured in position about the valve stem 116 by way of any a variety of screws, bolts, nuts or other mechanical fasteners to block removal of the base from the valve stem.

Notwithstanding the fact that in the present embodiment, the clamp member 122 is a hose clamp, it is nevertheless an intention of this invention to include embodiments having a variety of clamping mechanisms other than a hose clamp. For example, in other embodiments (not show), one or more set screws or one or more snap rings can be employed for holding the base member 120 in position about the valve stem 116. In yet other embodiments (also not shown), a variety of clamping mechanisms including, for example, screw/band clamps, spring clamps, wire, ear clamps etc. can be employed. Generally speaking, the choice of the clamp member 122 can be based upon a number of factors, such as, the size of the valve stem 116, presence and/or location of any groove/undercut for securing one or more snap rings, ease of installing the clamp member about the valve stem and the like.

Referring still to FIGS. 1 and 2, the cover member 124 is a cup or cup-like structure defining a cavity for being positioned over the valve stem 116 and releasably engaging the base member 120 to restrict access to the valve stem. To facilitate engagement with the base member 120, the cover member 124 is equipped with an engaging member 140 having a plurality of L-shaped tabs (or protrusions) 142 extending downwardly and outwardly from an outer periphery 144 of a bottom portion 146 of the cover member. In at least some embodiments, the width of each of the plurality of tabs 142 can vary, as described below. Furthermore, the number of the plurality of tabs 142 can vary from one embodiment to another. Typically, and preferably, the number of the plurality of tabs 142 match the number of the plurality of slots 130 on the base. For example, in the present embodiment in which the plurality of slots 130 are three in number, the plurality of tabs 142 on the cover are also three in number (albeit only two are visible in FIG. 2).

In addition to the plurality of tabs 142, the cover member 124 has formed adjacent to and extending outwardly from the bottom portion 146, a flange member 150. Similar to the flange member 136 on the base member 120, the flange member 150 has defined therein a locking aperture (or shackle hole) 152. The flange member 150 is designed such that upon engagement of the plurality of tabs 142 with the plurality of slots 130, the flange members 136 and 150 and particularly, the respective locking apertures 138 and 152 of the flange members, are aligned together such that a padlock 154 (See FIG. 1) can be installed through those locking apertures. Various other locking devices and/or mechanisms, not shown, for interlocking the flange members 136 and 150 can be employed as well in other embodiments.

To ensure alignment of the flange members 136 and 150 and, particularly, the alignment of the respective locking apertures 138 and 152 of the flanges, in at least some embodiments, the width of at least one of the plurality of tabs 142 can be wider than the remaining tabs such that the wider one of the plurality of tabs can only be inserted in a corresponding one of the plurality of slots 130 in which the width of the second length 134 matches the width of the wider tab. In other embodiments (not shown), one or more of the plurality of tabs 142 can have varying widths and/or shapes, and the second lengths 134 of one or more of the plurality of slots 130 on the base member 120 can be correspondingly sized and shaped to ensure alignment of the flange members 136 and 150. In alternate embodiments (not shown), other mechanisms for ensuring alignment of the flange members 136 and 150 can be utilized as well.

Figure 3:
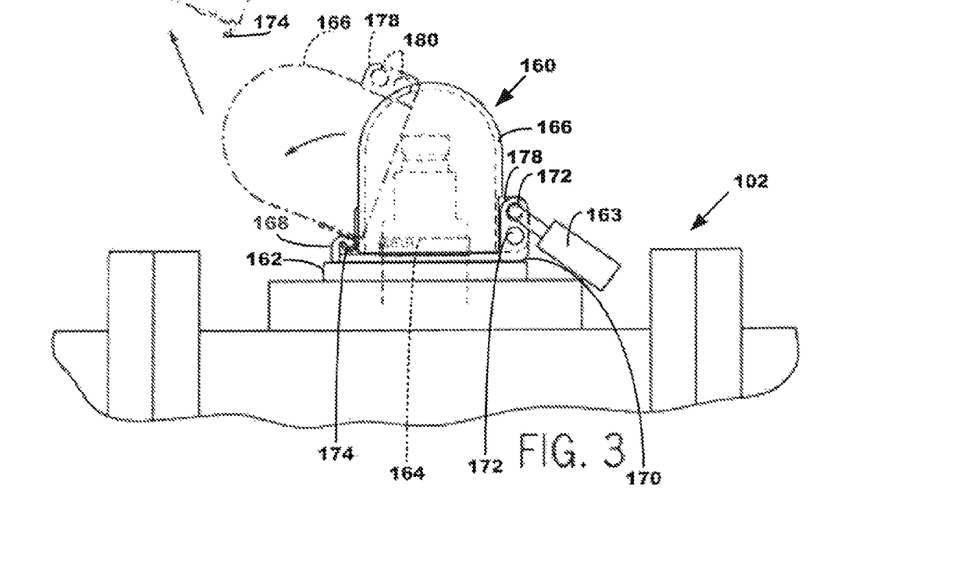
FIG. 3 shows, in cut-away, a front portion of the plug valve of FIG. 1 utilizing a second embodiment of the valve locking assembly, in accordance with at least some other embodiments of the present invention.
Figure 4:
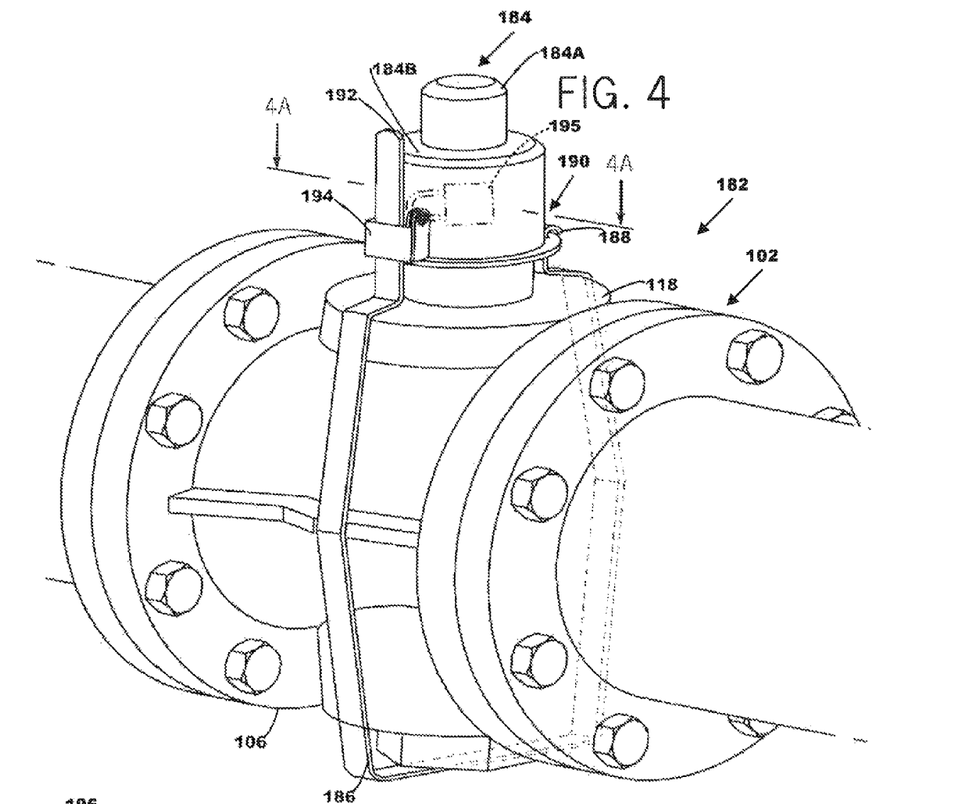
FIG. 4 shows a front perspective view of the plug valve of FIG. 1 utilizing a third embodiment of the valve locking assembly, in accordance with at least some alternate embodiments of the present invention.

Furthermore, to properly position the cover member 124 about the valve stem 116 and to engage the base member 120, the shape and size of the cover can vary. For example, as shown in FIGS. 1 and 2 of the present embodiment, the cover can have a frustro-conical shape, such that the bottom portion 146 is wider than a truncated top portion 156. In other embodiments, the cover member 124 can have a dome or dome-like shape, as shown in FIG. 3 or a nested cover shape, as shown in FIGS. 4 and 5. Additionally, the shape and circumference of the bottom portion 146 of the cover member 124 can vary depending upon the shape and size of the base member 120 as well as the manner of engaging the cover to the base. Preferably, the shape and size of the bottom portion 146 of the cover member 124 will conform to the shape and size of the base member 120. However, in at least some embodiments and as shown in FIGS. 1 and 2, the circumference of the bottom portion 146 of the cover member 124 can be smaller than the circumference of the base member 120 to facilitate engagement of the plurality of tabs 142 on the cover with the plurality of slots 130 on the base member.

Figures 2A, 2B, 2C:
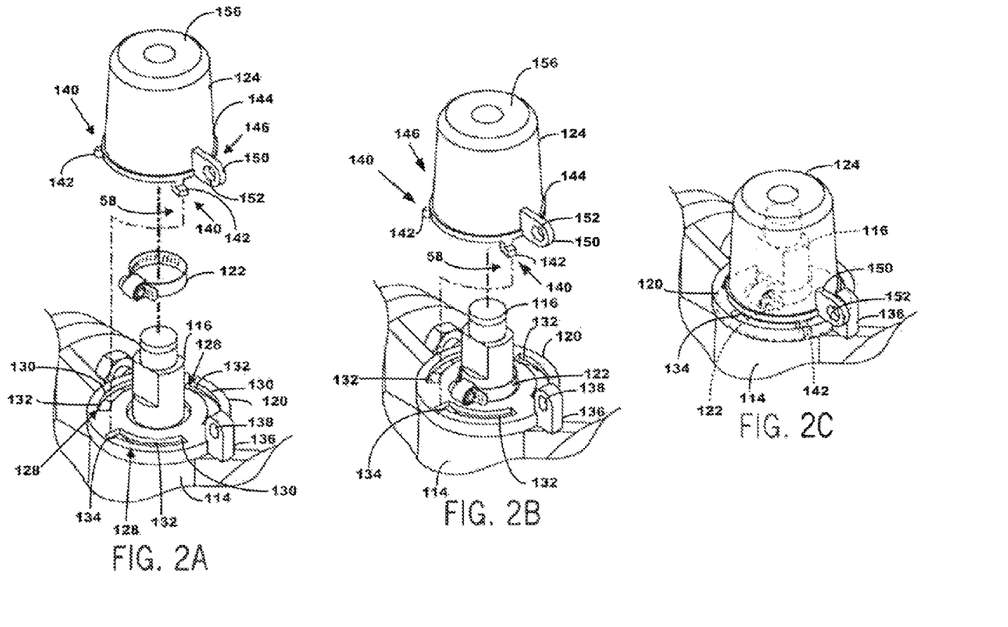
FIGS. 2A-2C show a portion, in cut-away, of the plug valve of FIG. 1, and further show exemplary steps of assembling the valve locking assembly of FIG. 1 over the plug valve.

Thus, in at least some embodiments, the valve locking assembly 104 includes the base member 120, the clamp member 122 and the cover member 124 assembled in operational associations. In operation, as described with respect to FIGS. 2A-2C, the base member 120 is placed through the valve stem opening 126 about the valve stem 116 of the valve 302. Typically, the base member 120 is positioned adjacent to or in place of the handle or wrench utilized for actuating the valve member 314, as shown in FIG. 2A. Subsequent to positioning the base member 120 around the valve stem 116, the clamp member 122 (e.g., the hose clamp) can be assembled and tightly fastened about the valve stem above the base member, as shown in FIG. 2B. As indicated above, by virtue of installing the clamp member 122, the base member 120 is prevented from removal relative to the valve stem 116.

Once the clamp member 122 is affixed into position, the cover member 124 can be releasably engaged to the base member by positioning the cover member over the base and the clamp members 320 and 122, respectively, to receive the valve stem 116 into the cavity defined therein, as shown in FIG. 2C. Specifically, each one of the plurality of tabs 142 on the cover member 124 can be aligned with adjoining and corresponding (e.g., matching widths) one of the plurality of slots 130 and, particularly, with the second length 134 of the corresponding one of the plurality of slots on the base member. After inserting each one of the plurality of tabs 142 into the corresponding one of the second length 134 of the plurality of slots 130, the cover member 124 can be rotated (e.g., in a direction shown by arrows 358) with respect to the base member 120 within the first length 132 to align the flange members 136 and 150 and, particularly, the respective locking apertures 138 and 152 of the flange members.

In at least some embodiments, the locking apertures 138 and 152 are aligned when the plurality of tabs 142 have been rotated to a distal end away from the second length of the plurality of slots 130. After the locking apertures 138 and 152 have been aligned, the padlock 154 (or other locking devices) can be installed through those locking apertures to lock the cover in place over the base member 120 to obtain the assembled valve locking assembly 304 of FIG. 1, described above. By virtue of installing the padlock 154, the valve stem 116 cannot be accessed without the usage of tools and/or force for unlocking the padlock 154, thereby restricting access to the valve stem. In addition, it should be noted that, although installation of the padlock 154 through the cover member 124 and the base member 120 does not restrict rotation of the base member, it does restrict rotational movement of the base member in a manner that avoids the base member from acting like a "wrench" to cause accidental actuation of the valve member 114 resulting in undesirable opening and/or closing of the valve 102. Further, any damage to the valve stem 116 is avoided. It should also be noted that the valve locking assembly 104 is directly attached to the top surface 118 of the valve 102 about the valve stem 116. Thus, the valve locking assembly 104 can also be conveniently employed in valves with handles removed.

Turning now to FIGS. 3-5, alternate embodiments of the valve locking assembly 104 are shown, in accordance with at least some embodiments of the present invention. Referring specifically to FIG. 3, a second embodiment of a valve locking assembly 160 assembled over the valve 102 is shown, in accordance with at least some embodiments of the present invention. Generally speaking, the second embodiment of the valve locking assembly 160 is similar to the valve locking assembly 104 of FIGS. 1 and 2 in that the valve locking assembly 160 also includes a base member 162, a clamp member 164 and a cover member 166 connected together in operational association.

However, in lieu of the slide 128 on the base member 120 for engaging the cover member 124, the base member 162 is equipped with a base hook 168 on one side of the periphery and a flange member 170 having a pair of locking apertures 172 on the other side of the periphery (e.g., diametrically opposite). Relatedly, in lieu of the engaging member 140 on the cover member 124, the cover member 166 is equipped with a mating hook 174 on a bottom portion 176 along the periphery of the cover member and a flange member 178 having a pair of locking apertures 180 adjacent the periphery along the bottom portion on the other side. The hook 174 and the flange member 178 are formed (or alternatively connected) on the cover member 166 to correspond to the hook 168 and the flange member 170 of the base member 162, respectively.

By virtue of providing the respective hooks 168 and 174 on the base and the cover members 162 and 166, respectively, the cover member can be releasably hingedly connected to the base member for restricting access to the valve stem 116. Thus, in operation, the base member 162 can be seated around the valve stem 116 via an opening (e.g., similar to the valve stem opening 126) defined in the base member and clamped into position by employing the clamp member 164. Similar to the clamp member 122, the clamp member 164 can be a hose clamp that can be positioned over the base member and connected to the valve stem 116 to prevent removal of the base member from the valve stem.

The cover member 166 can then be removably attached, as indicated by the cover members in phantom, to the base member 162 by way of hingedly connecting the hooks 168 and 174 together. It should be noted that in at least some embodiments, the cover member 166 can be hingedly connected to the base member 162 via the hooks 168 and 174 prior to installation of the base member about the valve 116. Subsequent to installing (e.g., via the clamp member 164) the base about the valve stem 116 and hingedly connecting the cover member 166 to the base member 162, a padlock 163 can be installed to the one of the pair of locking apertures 172 and 180 for restricting access to the valve stem.

Notwithstanding the fact that in the present embodiment, the cover member 166 is a dome-shaped cover, in other embodiments, the cover member can assume a frustro-conical or a nested shape as well. As indicated above, similar to the cover 124, other shapes and sizes for the cover member 166 are contemplated and considered within the scope of the present invention. Furthermore, with respect to the flange members 170 and 178, although each of those flanges is defined with a pair of the locking apertures 172 and 180, it is an intention of this invention to include embodiments in which each of the flange members is designed with a single locking aperture, similar to the flange members 136 and 150 having the locking apertures 138 and 152, respectively, of FIGS. 1 and 2, or alternatively, more than two locking apertures as well. Furthermore, the hinged connection between the cover member 166 and the base member 162 can be facilitated by any of a variety of hinged connecting mechanisms (e.g., male and female connection mechanisms), not just by way of the hooks 168 and 174.

Turning now to FIG. 4, a third embodiment of a valve locking assembly 182 assembled over the valve 102 is shown, in accordance with at least some embodiments of the present invention. As Illustrated, the valve locking assembly 182 includes a cover member 184 releasably connected to the top surface 118 of the valve 102 by way of a strap 186. The strap 186 in particular is a flexible infinitely adjustable strap clamp that can be constructed out of any of a wide variety of durable and flexible rigid or semi-rigid materials and can be wrapped around the valve body 106 for engaging the cover member 184 to the top surface 118 of the valve 102. In particular, a first end 188 of the strap 186 can be connected to a bottom portion 190 of the cover 184, while a second end 192 of the strap after being wrapped (a portion of the strap behind the valve body is shown in phantom) around the valve body 106 can be releasably connected to a clamp member 194 attached to the cover member. Specifically, the second end 192 of the strap 186 is slid through the clamp member 194 and fastened thereto, in a manner that only allows the strap to get tighter to the valve. The clamp member 194 can be locked into position by way of a padlock 195, which is shown in phantom in FIG. 4. An exemplary clamp member 194 is described in greater detail in FIGS. 4A-4C.

Thus, by virtue of employing the flexible strap 186, the cover member 184 can be releasably engaged to the top surface 118 of the valve 102 to restrict access to the valve stem. Also, by virtue of affixing the clamp member 194 to the cover member 184 and by affixing the strap 186 to the clamp member, rotational movement of the cover member relative to the valve stem, and also the relative movement of the valve member 114 relative to the valve stem 116 can be restricted, thereby preventing accidental operation of the valve 102.

Figures 4A, 4B:
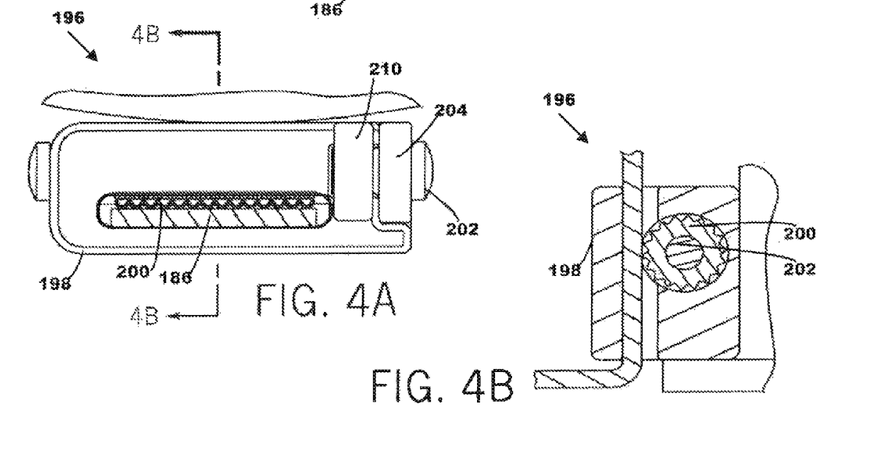
FIG. 4A shows a top view of an exemplary clamp member as viewed along a line 4A-4A of FIG. 4, the clamp member being utilized in the third embodiment of valve locking assembly.
FIG. 4B is a cross-sectional view of the clamp member taken along line 4B-4B of FIG. 4A.
Figures 4C, 5:
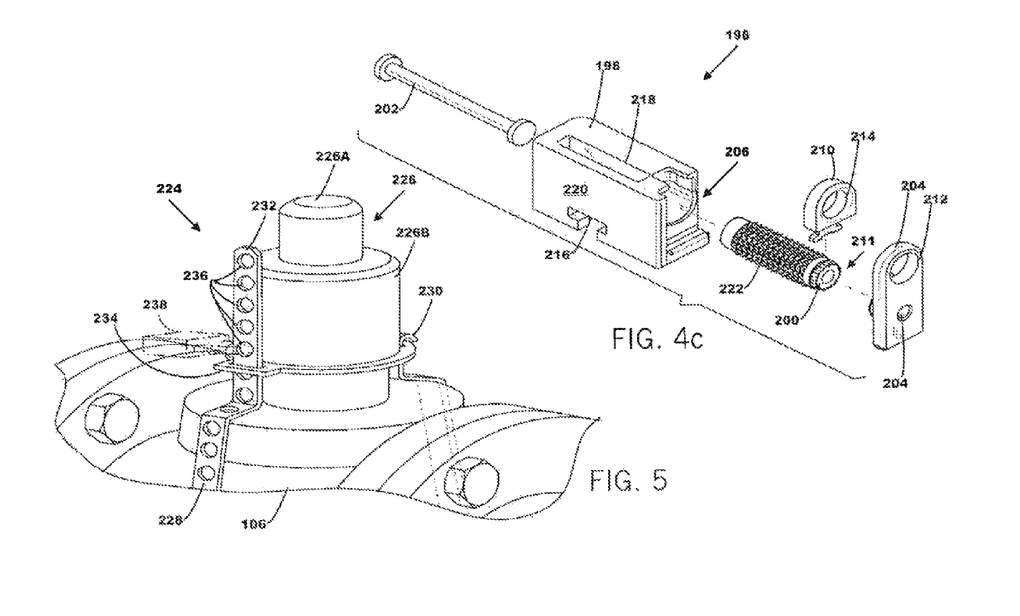
FIG. 4C is an exploded view of the clamp member of FIG. 4A.
FIG. 5 shows a portion, in cut-away, of the plug valve of FIG. 1 and employing a variation of the valve locking assembly of FIG. 4.

Referring now to FIGS. 4A-4C, an exemplary embodiment of a clamp device 196 that can be employed for purposes of the clamp member 194 is shown, in accordance with at least some embodiments of the present invention. As shown specifically in FIG. 4C, the clamp device 196 includes a clamp body 198 for housing a gripping mechanism 200 by way of a pin 202. The clamp device 196 additionally includes a first flange 204 connected to an end portion 206 of the clamp body 198. The first flange 204 is typically connected by way of the pin 202 extending through an aperture 208 of the first flange. The clamp device 196 further includes a second flange 210 connected to a top end portion 211 of the gripping mechanism 200 for alignment with the first flange. Each of the first and the second flanges 204 and 210, respectively, are designed with respective locking apertures 212 and 214, to which the padlock 195 can be affixed for securing the cover member 184 to the top surface 118 of the valve 102.

The strap 186 can be fastened to the clamp device 196 by sliding the strap into the clamp body 198 through a bottom slot 216 and out through a top slot 218 such that the strap is sandwiched between the gripping mechanism 200 and an internal surface of wall 220 of the clamp body. Upon sliding the strap 186 through the clamp body 198, the flanges 204 and 210 can be aligned together such that the locking apertures 212 and 214, respectively, of those flanges are aligned together to which the padlock 195 can be installed. By virtue of weaving the strap 186 through the clamp body 198 and by virtue of aligning the flanges 204 and 210 and installing the padlock 195, the gripping mechanism 200 presses the strap against the wall 220 such that teeth 222 on the gripping mechanism hold the strap tightly in position.

Although a specific exemplary clamp device (e.g., the clamp device 196) has been explained above, it can be understood that various other types of clamping devices and mechanisms for releasably and tightly connecting the cover member 184 to the top surface 118 of the valve 102 can be employed. A variation of the clamp member 194 and a variation of the strap 186 is described below with respect to FIG. 5. Furthermore, it should be noted that although the cover member 184, which includes a first top section 184A and a second bottom section 184B, is a nested-type cover (e.g., nesting the first section 184A within the second section 184B), in other embodiments, the cover member can be frustro-conical, dome-shaped or can potentially assume other shapes as well.

Turning now to FIG. 5, a fourth embodiment of a valve locking assembly 224 installed over the valve 102, which is shown in cut-away, is illustrated in accordance with at least some embodiments of the present invention. In particular, the valve locking assembly 224 is similar in certain respects to the valve locking assembly 182 of FIG. 4 in that the valve locking assembly 224 includes a cover member 226 having a first top section 226A nested within a second bottom section 226B, the cover member releasably engaged to the valve body 106 by a strap 228. Similar to the strap 186, the strap 228 is a flexible strap clamp connected at a first end 230 to the cover member 226. However, a second end 232 of the strap 228, after being wrapped around the valve body 106 is slid through a slot 234 formed (or alternatively connected to) in the cover member 226, as opposed to being engaged with the clamp member 194. Further, the strap 228 is designed with a plurality of holes 236 adjacent the second end 232, such that, a padlock (shown in phantom) 238 can be installed to one of those holes above the slot 234 to prevent removal of the cover member 226 from engagement with the top surface 118 of the valve 102. Thus, due to securing the cover member 226 about the top surface 118, the strap 228 restricts access to the valve stem 116.

Accordingly, in at least some embodiments, the present invention provides a valve comprising a valve stem and a locking assembly in locking engagement with the valve stem. The locking assembly comprises a first means for receiving the valve stem and comprising an engaging member; a second means for receiving the valve stem and comprising a slide for engaging the engaging member of the first means, the slide having a first length along an outer periphery of the second means and a second length intersecting the first length such that the second length is shorter than the first length; and a third means for releasably securing the second means in position about the valve stem; wherein the first means is capable of being positioned over the second and the third means about the valve stem.

In at least some other embodiments, the present invention provides a kit for restricting access to a valve stem of a valve. The kit comprises a cover defining a cavity for receiving a valve stem of a valve and further having an engaging member; one or more base members, each of the base members having (i) a slide for engaging the engaging member of the cover, the slide comprising a first length along an outer periphery of the base and a second length intersecting the first length such that the second length is shorter than the first length; and (ii) a valve stem opening for receiving the valve stem of the valve; and a clamping mechanism for releasably securing the one or more base members in position about the valve stem of the valve; wherein the valve stem opening of each of the one or more base members is of varying sizes to accommodate the valve stem of varying sizes. It will be noted that typically, the kit comes with the various aforementioned components in a disassembled form to facilitate the user to select and pick the appropriate base member for a particular sized valve stem. It will further be understood that the one or more base members generally come in a range of sizes within the kit, sized particularly such that all of the bases engage the cover in one of the manners described above and the central opening of each of those base members varies to accommodate valve stems of various sizes.

While the FIGS. 1-5 described above show various exemplary embodiments of a locking assembly for restricting access to a valve stem of a valve, the present invention is intended to encompass a variety of other alternative embodiments (not shown) having one or more features differing from or in addition to those described above. For example, in at least some alternate embodiments, the shapes, sizes, orientations and material of construction of the various components employed in the valve locking assembly can vary from those shown in FIGS. 1-5. For example, in at least some embodiments, the various components of the valve locking assemblies can be constructed out of plastic (e.g., injection molded plastic), while in other embodiments, materials such as steel, aluminum, wood, or other suitable and durable rigid or semi-rigid materials can be employed.

It is specifically intended that the present invention not be limited to the embodiments and illustrations contained herein, but include modified forms of those embodiments including portions of the embodiments and combinations of elements of different embodiments as come within the scope of the following claims.

We claim:

1. A locking assembly for restricting access to a valve stem of a valve, the assembly comprising:
   A. a first means for receiving a valve stem of a valve and comprising an engaging member;
   B. a second means for receiving the valve stem of the valve and comprising a slide for engaging the engaging member of the first means, the slide having a first length along an outer periphery of the second means and a second length intersecting the first length such that the second length is shorter than the first length; and
   C. a third means for releasably securing the second means in position about the valve stem of the valve;
   wherein the first means is capable of being positioned over the second and the third means about the valve stem; and
   wherein the third means is a hose clamp.

2. The locking assembly of claim 1, wherein the first means is a cup-cover defining a cavity for receiving the valve stem.

3. The locking assembly of claim 1, wherein the second means further comprises an opening for receiving the valve stem of the valve.

4. A valve secured by the locking assembly of claim 1.

5. The locking assembly of claim 4, wherein the valve is a plug valve.

6. The locking assembly of claim 5, further comprising a padlock capable of being installed through the aligned first and the second locking apertures to interlock the first and the second means in position.

7. The locking assembly of claim 1, wherein the first means further includes a flange member extending outwardly adjacent a bottom portion and defining a first locking aperture, and the second means further includes a flange member extending outwardly from an outer periphery and defining, a second locking aperture, such that upon engagement of the first and the second means, the first and the second locking apertures are capable of being aligned together.

8. The locking assembly of claim 7, wherein the flange member from the second means extends in a direction towards the first means.

9. The locking assembly of claim 8, wherein the hose clamp is configured to be clamped to the valve stem above the second means.

10. The locking assembly of claim 1, wherein the hose clamp is configured to be clamped to the valve stem above the second means.

11. The locking assembly of claim 10, wherein the engaging member comprises a plurality of tabs formed on a bottom portion of the first means and the slide comprises a plurality of slots sized to accommodate the plurality of tabs, each of the plurality of slots having the first and the second lengths for engagement with the plurality of tabs.

12. The locking assembly of claim 11, wherein the plurality of tabs are configured to be received in the second length of the slots and rotated along the first length of the slots.

13. The locking assembly of claim 11, wherein the plurality of tabs, when engaged, does not project beyond the face of the second means most distal from the third means.

14. The locking assembly of claim 1, wherein the engaging member comprises a plurality of tabs formed on a bottom portion of the first means and the slide comprises a plurality of slots sized to accommodate the plurality of tabs, each of the plurality of slots having the first and the second lengths for engagement with the plurality of tabs.

15. The locking assembly of claim 14, wherein the plurality of tabs are configured to be received in the second length of the slots and rotated along the first length of the slots.

16. The locking assembly of claim 14, wherein the plurality of tabs, when engaged, does not project beyond the face of the second means most distal from the third means.

17. A locking assembly for restricting access to a valve stem of a valve, the assembly comprising:
   A. a first means for receiving a valve stem of a valve and comprising an engaging member;
   B. a second means for receiving the valve stem of the valve and comprising a slide for engaging the engaging member of the first means, the slide having a first length along an outer periphery of the second means and a second length intersecting the first length such that the second length is shorter than the first length; and
   C. a third means for releasably securing the second means in position about the valve stem of the valve;
   wherein the first means is capable of being positioned over the second and the third means about the valve stem; and
   wherein the engaging member comprises a plurality of tabs formed on a bottom portion of the first means and the slide comprises a plurality of slots sized to accommodate the plurality of tabs, each of the plurality of slots having the first and the second lengths for engagement with the plurality of tabs.

18. The locking assembly of claim 17, wherein upon engagement of the plurality of tabs with the plurality of slots, each of the plurality of tabs is positioned at a distal end of the first length away from the second length to releasably engage the first means to the second means to restrict access to the valve stem.

19. The assembly of claim 17 comprising three tabs and three slots.

20. The locking assembly of claim 17, wherein each of the plurality of slots of the second means is L-shaped such that the second length extends transversely from an end portion of the first length.

21. The locking assembly of claim 17, wherein the plurality of tabs are configured to be received in the second length of the slots and rotated along the first length of the slots.

22. The locking assembly of claim 21, wherein the plurality of tabs, when engaged, does not project beyond the face of the second means most distal from the third means.

23. The locking assembly of claim 21, wherein the first means further includes a flange member extending outwardly adjacent a bottom portion and defining a first locking aperture, and the second means further includes a flange member extending outwardly from an outer periphery and defining a second locking aperture, such that upon engagement of the first and the second means, the first and the second locking apertures are capable of being aligned together.

24. The locking assembly of claim 23, wherein the flange member from the second means extends in a direction towards the first means.

25. The locking assembly of claim 17, wherein the plurality of tabs, when engaged, does not project beyond the face of the second means most distal from the third means.

26. The locking assembly of claim 17, wherein the first means further includes a flange member extending outwardly adjacent a bottom portion and defining a first locking aperture, and the second means further includes a flange member extending outwardly from an outer periphery and defining a second locking aperture, such that upon engagement of the first and the second means, the first and the second locking apertures are capable of being aligned together.

27. The locking assembly of claim 26, wherein the flange member from the second means extends in a direction towards the first means.

28. A method for restricting access to a valve stem of a valve, the method comprising:
　A. providing (a) a base having a slide, the slide comprising a first length along an outer periphery of the base and a second length intersecting the first length such that the second length is shorter than the first length; (b) a clamping mechanism for releasably securing the base in position about a valve stem of a valve; and (c) a cover defining a cavity for receiving the valve stem and further having an engaging member for engagement with the slide of the base;
　B. positioning the base around the valve stem of the valve;
　C. securing the base in position about the valve stem by utilizing the clamping mechanism; and
　D. engaging the cover with the base for restricting access to the valve stem.

29. The method of claim 28, wherein positioning the base around the valve stem of the valve comprises:
　A. defining an opening in the base and receiving the valve stem of the valve through the opening.

30. The method of claim 28, wherein the clamping mechanism is a hose clamp and securing the base in position by utilizing the clamping mechanism comprises:
　A. positioning the hose clamp over the base about the valve stem; and
　B. fastening the hose clamp to secure the base in position.

31. The method of claim 28, wherein engaging the cover with the base comprises:
　A. providing (a) a base flange extending outwardly from an outer periphery of the base and defining a first locking aperture; and (b) a cover flange extending outwardly adjacent a bottom portion of the cover and defining a second locking aperture;
　B. positioning the cover over the base about the valve stem;
　C. aligning and inserting the engaging member on the cover into the second length of the slide on the base;
　D. rotating the cover with respect to the base to position the engaging member at a distal end of the first length away from the second length to align the first and the second locking apertures; and
　E. installing a padlock through the first and the second locking apertures to interlock the base and the cover together.

32. A valve comprising a valve stem and a locking assembly in locking engagement with the valve stem, the locking assembly comprising:
　A. a first means for receiving the valve stem and comprising an engaging member;
　B. a second means for receiving the valve stem and comprising a slide for engaging the engaging member of the first means, the slide having a first length along an outer periphery of the second means and a second length intersecting the first length such that the second length is shorter than the first length; and
　C. a third means for releasably securing the second means in position about the valve stem;
　　wherein the first means is capable of being positioned over the second and the third means about the valve stem; and
　　wherein the engaging member comprises a plurality of tabs formed on a bottom portion of the first means and the slide comprises a plurality of slots sized to accommodate the plurality of tabs, each of the plurality of slots having the first and the second lengths for engagement with the plurality of tabs.

33. A kit for restricting access to a valve stem of a valve, the kit comprising:
　A. a cover defining a cavity for receiving a valve stem of a valve and further having an engaging member;
　B. at least one base member, the at least one base member having (i) a slide for engaging the engaging member of the cover, the slide comprising a first length along an outer periphery of the base and a second length intersecting the first length such that the second length is shorter than the first length; and (ii) a valve stem opening for receiving the valve stem of the valve; and
　C. a clamping mechanism for releasably securing the at least one base member in position about the valve stem of the valve;
　wherein the valve stem opening of the at least one base member includes at least one of a size and a shape that is configured to accommodate the valve stem; and wherein the clamping mechanism is positionable above the base and the cover is releasably positionable over the base member and the clamping mechanism to receive the valve stem.

* * * * *